(12) United States Patent
Drumm

(10) Patent No.: US 8,979,218 B2
(45) Date of Patent: Mar. 17, 2015

(54) BRAKE SYSTEM FOR MOTOR VEHICLES

(75) Inventor: Stefan A. Drumm, Saulheim (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 195 days.

(21) Appl. No.: 13/819,912

(22) PCT Filed: Aug. 19, 2011

(86) PCT No.: PCT/EP2011/064254
§ 371 (c)(1),
(2), (4) Date: Feb. 28, 2013

(87) PCT Pub. No.: WO2012/028472
PCT Pub. Date: Mar. 8, 2012

(65) Prior Publication Data
US 2013/0162013 A1  Jun. 27, 2013

(30) Foreign Application Priority Data

Sep. 1, 2010  (EP) .......................... 10 2010 040 078

(51) Int. Cl.
| | |
|---|---|
| *B60T 8/44* | (2006.01) |
| *B60T 8/40* | (2006.01) |
| *B60T 13/58* | (2006.01) |
| *B60T 7/06* | (2006.01) |
| *B60T 13/68* | (2006.01) |
| *B60T 7/04* | (2006.01) |
| *B60T 11/20* | (2006.01) |
| *B60T 13/12* | (2006.01) |
| *B60T 13/66* | (2006.01) |

(52) U.S. Cl.
CPC ............... *B60T 8/4077* (2013.01); *B60T 13/58* (2013.01); *B60T 7/06* (2013.01); *B60T 13/686* (2013.01); *B60T 7/042* (2013.01); *B60T 11/203* (2013.01); *B60T 13/12* (2013.01); *B60T 13/662* (2013.01)

USPC ...................................................... 303/114.1

(58) Field of Classification Search
USPC .............. 303/2, 3, 13–15, 114.1; 60/567, 568
See application file for complete search history.

(56) References Cited

U.S. PATENT DOCUMENTS

2002/0140283 A1* 10/2002 Kusano et al. ............. 303/114.1
2008/0258546 A1* 10/2008 Drumm et al. ............. 303/115.4

(Continued)

FOREIGN PATENT DOCUMENTS

| DE | 101 04 238 A1 | 10/2001 |
| DE | 10 2004 025 638 A1 | 9/2005 |
| WO | WO 01/72567 A1 | 10/2001 |
| WO | WO 2010/089161 A1 | 8/2010 |

OTHER PUBLICATIONS

PCT International Search Report—Oct. 27, 2011.

(Continued)

*Primary Examiner* — Melanie Torres Williams
(74) *Attorney, Agent, or Firm* — Brinks Gilson & Lione

(57) ABSTRACT

A brake system for motor vehicles, which in a "brake by wire" mode, can be activated both by the vehicle driver and also independently of the vehicle driver, which is operated preferentially in the "brake by wire" operating mode and can be operated in a fall-back mode. A pedal force actuating element connected to a brake pedal is guided in a retaining piston forming a retaining chamber. Dividing piston devices interact with the retaining piston and connected to vehicle wheel brakes. The first dividing piston and the second dividing piston surface are formed on a first dividing piston portion and the first dividing piston surface, together with a third dividing piston surface formed on a second dividing piston portion form an intermediate chamber connected to electro-hydraulic pressure generating device. A pressure modulation valve enables both a build-up of pressure in and also a discharge of pressure from the intermediate chamber.

15 Claims, 2 Drawing Sheets

(56) References Cited

U.S. PATENT DOCUMENTS

2008/0284242 A1* 11/2008 Ganzel ................. 303/114.1
2011/0291469 A1* 12/2011 Drumm ..................... 303/2

OTHER PUBLICATIONS

German Examination Report—Feb. 14, 2011.

* cited by examiner

BRAKE SYSTEM FOR MOTOR VEHICLES

CROSS-REFERENCE TO RELATED APPLICATIONS

This application claims priority to German Patent Application No. 10 2010 040 078.5, filed Sep. 1, 2010 and PCT/EP2011/064254, filed Aug. 19, 2011.

FIELD OF THE INVENTION

The present invention relates to a brake system for motor vehicles which, in a brake-by-wire operating mode, can be activated both by the vehicle driver and also independently of the vehicle driver.

BACKGROUND AND SUMMARY OF THE INVENTION

The system in accordance with the present invention is operated preferably in the brake-by-wire operating mode and can be operated in at least one fall-back operating mode in which only operation by the vehicle driver is possible, having:

a) a brake pedal for actuating a pedal force transmitting element on which an actuating force (pedal force) is exerted when the brake system is actuated by the vehicle driver, which pedal force transmitting element is restored to a starting position by a return spring when the pedal is not actuated and which is guided displaceably along an actuation axis in a hydraulic retaining piston which delimits a hydraulic retaining chamber in a housing, b) a travel detecting device which detects the actuation travel of the pedal force transmitting element, c) a travel simulator which, in the brake-by-wire operating mode, communicates the usual brake pedal feel to the vehicle driver, which is in force-transmitting communication with the pedal force transmitting element and the effect of which can be switched off in the fall-back operating mode, d) an electrohydraulic pressure generating device which delivers a brake system pressure, e) electrically controllable pressure modulation valves for setting wheel-individual brake pressures which are derived from the brake system pressure, the pressure modulation valves delivering or transmitting the brake system pressure in the unactivated state, f) dividing piston devices which on a first dividing piston surface are subjected to the pressure set or transmitted by the pressure modulation valves, and on a second dividing piston surface build up a pressure which is transmitted via hydraulic connections to the wheel brakes, g) activating elements for mechanically activating the dividing piston devices, and h) an electronic control and regulation unit.

A prior art brake system of the general type as described above is known, for example, from the international patent application WO 01/72567 A1. The relatively complicated and costly configuration of the electrohydraulic means for setting the pressures impinging on the dividing pistons, in which a pair of pressure modulation valves is allocated to each dividing piston, is regarded as disadvantageous in the known brake system.

It is therefore the object of the present invention to achieve a simplification of the structure of the brake system of the type mentioned in the introduction, and to propose a brake system in which, especially in the area of the electrohydraulic means for setting the pressures impinging on the dividing pistons, a substantial constructional simplification and a reduction of manufacturing costs are achieved.

This object is achieved according to the invention in that the first dividing piston surface and the second dividing piston surface are formed on a first dividing piston portion, and the first dividing piston surface delimits with a third dividing piston surface formed on a second dividing piston portion an intermediate chamber which is connected to the electrohydraulic pressure generating device via one pressure modulation valve in each case, by means of which pressure modulation valve both a pressure build-up and a pressure reduction are effected in the intermediate chamber. Advantageous developments of the subject matter of the invention are described herein.

BRIEF DESCRIPTION OF THE DRAWINGS

In the following description the present invention is explained with respect to two exemplary embodiments and with reference to the appended schematic drawing, in which.

DETAILED DESCRIPTION OF THE INVENTION

Figure 1:
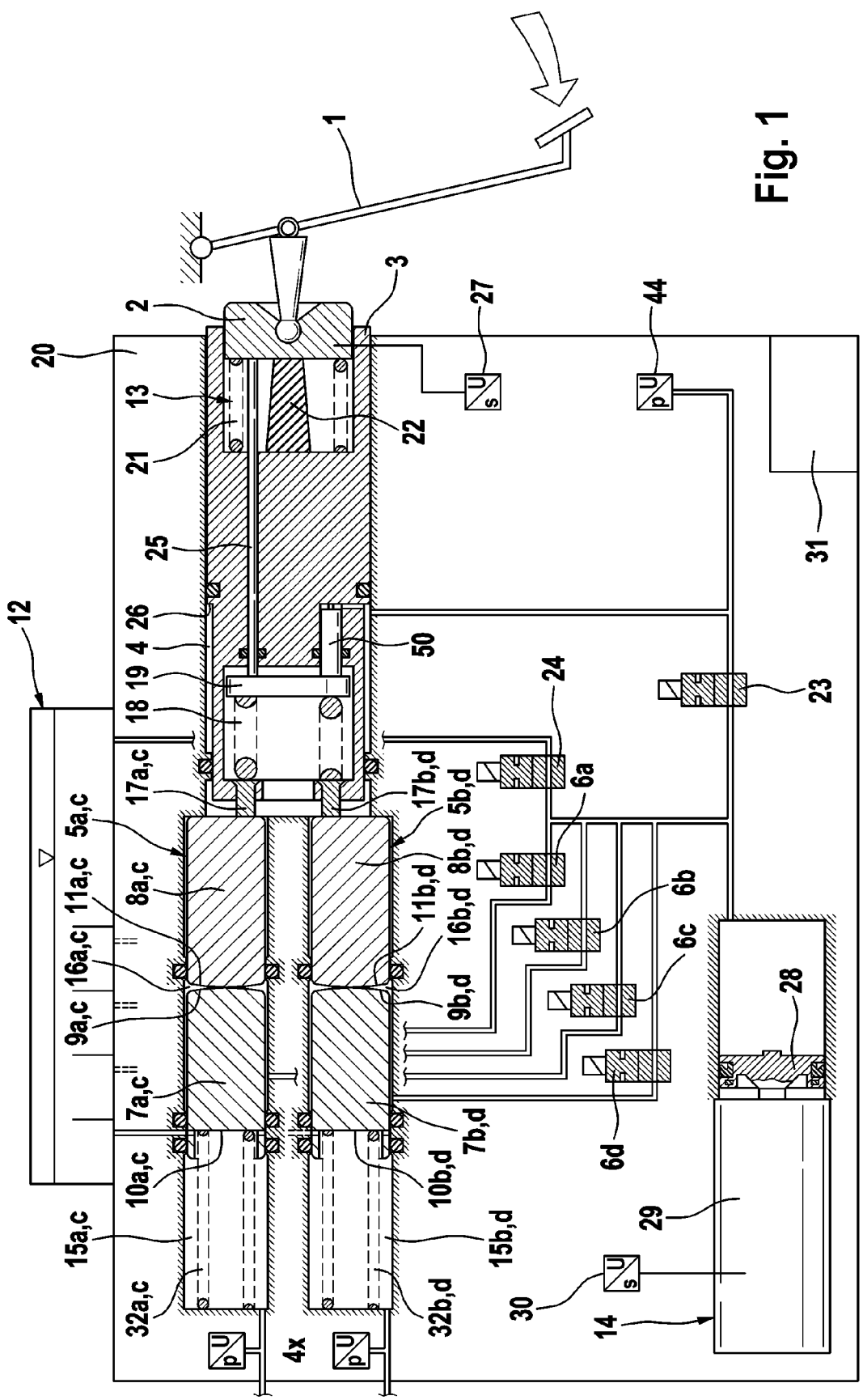
FIG. 1 shows a hydraulic circuit diagram of a first embodiment of the brake system according to the invention.

The brake system in accordance with the present in invention represented only schematically in the drawing and includes essentially a pedal force transmitting element 2 which can be actuated by means of a brake pedal 1 and which is guided displaceably in a hydraulic piston 3 of relatively large diameter, also referred to as the retaining piston, the annular face 26 of which delimits in a housing 20 a hydraulic retaining chamber 4 which coaxially encompasses the retaining piston 3. The brake system according to the invention further includes dividing piston devices 5a-d connected operatively downstream of the retaining piston 3, upstream of which dividing piston devices 5a-d are connected electrically controllable pressure modulation valves 6a-d and to which wheel brakes (not shown) are connected; a pressure medium reservoir 12, a travel simulator 13, a hydraulic pressure generating device 14 and an electronic control and regulation unit 16. In this case one dividing piston device 5a-d is preferably associated with each wheel brake. The dividing piston devices 5a-d preferably have a two-part configuration and consist of a first dividing piston portion 7a-d and a second dividing piston portion 8a-d. A first dividing piston surface 9a-d formed on the first dividing piston portion 7a-d delimits with a third dividing piston surface 11a-d formed on the second dividing piston portion 8a-d an intermediate chamber 16a-d which can be subjected via the pressure modulation valve 6a-d to the hydraulic pressure made available by the pressure generating device 14 in the form both of a pressure build-up and of a pressure reduction. For the pressure build-up in this case the brake system pressure is increased and pressure medium is displaced to the intermediate chamber 16a-d by the pressure generating device 14 via the pressure modulation valve 6a-d, whereas for the pressure reduction the brake system pressure is reduced and pressure medium is displaced from the intermediate chamber 16a-d via the pressure modulation valve 6a-d to the pressure generating device 14.

A second dividing piston surface 10a-d formed on the first dividing piston portion 7a-d delimits in the housing 20 a hydraulic pressure chamber 15a-d to which the aforementioned wheel brakes are connected. A return spring 32a-d, with the restoring force of which the individual dividing piston devices 5a-d are loaded against the actuation direction of the first dividing piston portions 7a-d, is arranged in the hydraulic pressure chamber 15a-d.

Force is transmitted between the retaining piston 3 and the dividing piston devices 5a-d by means of mechanical activation elements 17a-d which bear against the retaining piston 3, a compression spring 18 and a force transmitting plate 19 being interposed therebetween. In this case, the force transmitting plate 19 bears against the retaining piston 3 preferably via hydraulic means in the form of piston elements 50. Also bearing against the force transmitting plate 19 is at least one rod-shaped support force transmitting element 25 which cooperates with the pedal force transmitting element 2 and which is freely movable after the compression spring 18 has been compressed together by means of the hydraulic means 50, switching the travel simulator 13 to a free state. The travel simulator 13 is formed substantially by a parallel arrangement of a simulator spring 21 and an elastomeric spring 22, which bear against the pedal force transmitting element 2, the compression spring 18 and the simulator spring 21 being designed in such a way that the spring force of the compression spring 18 is substantially greater than that of the simulator spring 21. In this case the piston elements 50 can preferably be subjected to the hydraulic pressure admitted to the retaining chamber 4, the retaining chamber 4 being connected to the pressure generating device 14 via an interposed, currentlessly open (SO-) (i.e. normally open) 2/2-way valve 23. A second currentlessly open (SO-) 2/2-way valve 24 is incorporated in a hydraulic connection which connects the pressure generating device 14 to the pressure medium reservoir 12.

The actuation travel of the pedal force transmitting element 2 is detected by means of a travel detecting device 27 (indicated only schematically).

It is further apparent in the drawing that the aforementioned pressure generating device 14 is in the form of an electrohydraulic actuator, the actuator piston 28 of which can be activated by means of a schematically indicated electric motor 29 via a rotation-translation gear (not shown). In this case the distance traveled by the actuator piston 28 is monitored by a travel sensor carrying reference numeral 30.

Figure 2:
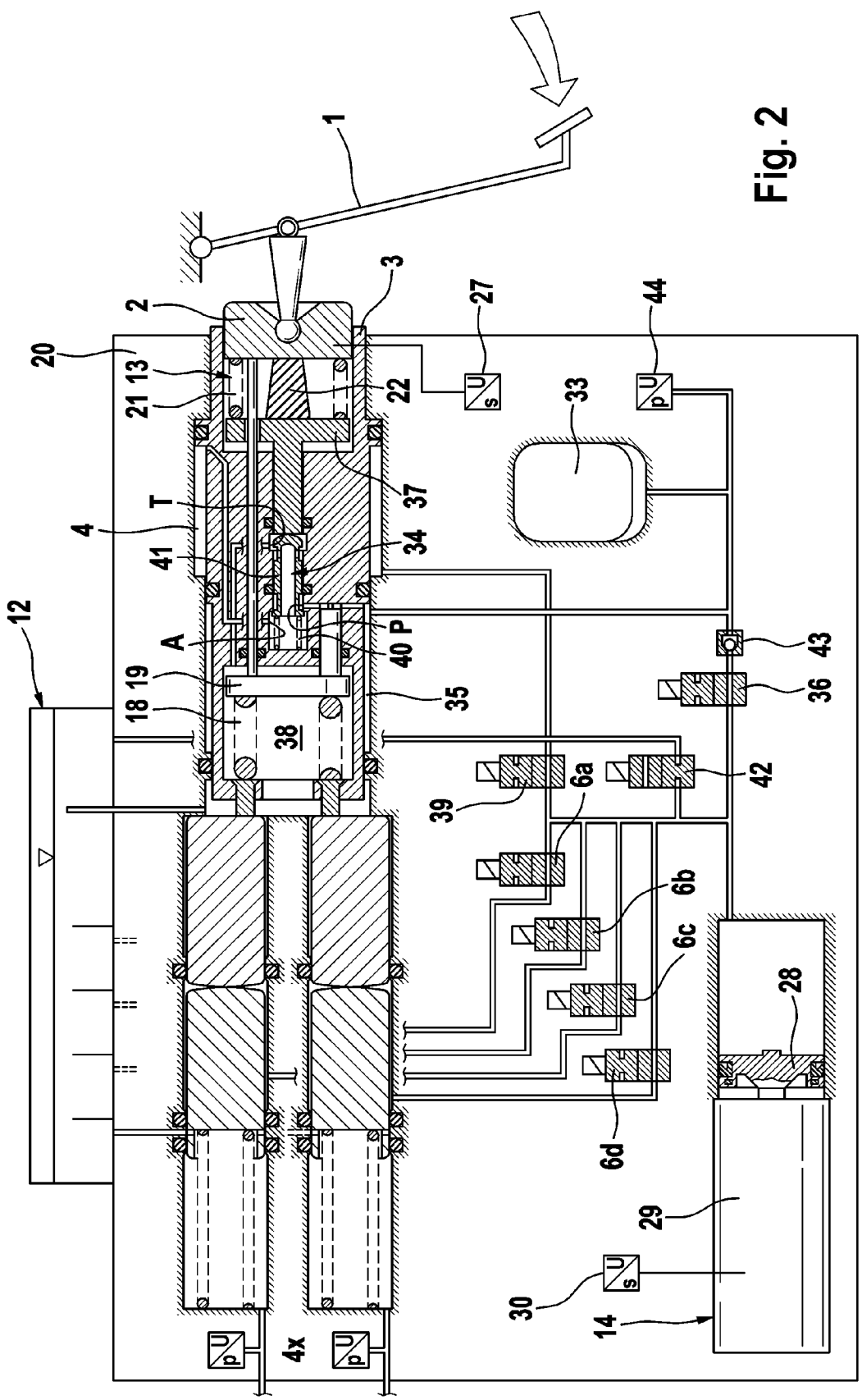
FIG. 2 is a representation corresponding to FIG. 1 of a second embodiment of the brake system according to the invention.

The structure of the embodiment of the subject matter of the invention shown in FIG. 2 is largely identical to the first embodiment represented in FIG. 1. Two essential differences are constituted by a high-pressure accumulator 33 chargeable by the pressure generating device 14 and a preferably mechanically actuable pressure-regulating valve arrangement 34, which is arranged coaxially with the retaining piston 3. In addition, the retaining piston 3 delimits in the housing 20 a second retaining chamber 35 which communicates with the high-pressure accumulator 33. An electromagnetically actuable, currentlessly open (SO-) 2/2-way valve denoted by reference numeral 36 in FIG. 2 enables, in its unactuated switching state, firstly, a connection between the pressure generating device 14 and the high-pressure accumulator 33 and, secondly, a connection between the pressure generating device 14 and the second retaining chamber 35. A discharge non-return (i.e. one way or check) valve 43 which opens to the high-pressure accumulator 33 is inserted in the line section between the 2/2-way valve 36 and the high-pressure accumulator 33. A pressure sensor 44 serves to detect the pressure available in the high-pressure accumulator 33.

It is further apparent from FIG. 2 that the pressure-regulating valve arrangement 34 is actuable by means of a pressure-regulating valve actuating element 37 against which the aforementioned simulator spring 21 and the elastomeric spring 22 bear. The pressure-regulating valve arrangement 34 is in the form of a spool valve and comprises a valve body 41 guided in the retaining piston 3 and preloaded in the direction of a pressure reduction position by means of a response spring 40, a reservoir connection T, a pressure supply connection P and a working connection A. In this case the reservoir connection T is connected to the pressure medium reservoir 12 via an unpressurized hydraulic chamber 38, which is formed in the retaining piston 3 and receives the compression spring 18 and the force transmitting plate 19. The pressure supply connection P is connected to the high-pressure accumulator 33 via the second retaining chamber 35, while the working connection A is in communication with the inlet connections of the pressure modulation valves 6a-d via the first retaining chamber 4 and a currentlessly open (SO-) 2/2-way valve 39. In addition, the outlet connection of the electrohydraulic pressure generating device 14 and the inlet connections of the pressure modulation valves 6a-d are connected to the pressure medium reservoir 12 via a currentlessly closed (i.e. normally closed)(SG-) 2/2-way valve 42.

As will be readily apparent from FIG. 2 to the person skilled in the art, the pressure-regulating valve arrangement 34 mentioned several times previously is in the form of a 3/3-way valve which can be activated by the driver by means of the pressure-regulating valve actuation element 37. In order to implement the pressure-regulating valve arrangement 34 represented in the drawing as a 3/3-way valve, both spool valve and seat valve technology, or a combination of these variants, may be used. It should be pointed out explicitly at this point that continuous transitional states exist between the switching positions of the pressure-regulating valve arrangement 34 with changing hydraulic passages and closures, which transitional states can be accessed stably with suitable activation by the control technology. The 3/3-way valve represented is therefore in the form of an analog valve and not of a switching valve with unstable transitional states.

In the following text the operation of the brake system according to the invention will be explained in more detail with reference to the exemplary embodiment shown in FIG. 1.

In the unactuated state of the brake pedal 1, the pedal force transmitting element 2, together with the brake pedal 1 coupled thereto, is held against a stop (not specifically denoted) by means of the parallel arrangement of the simulator springs 21, 22, while the retaining piston 3 is pressed by the preloaded compression spring 18 against a stop in the housing 20 and the dividing piston devices are pressed against the retaining piston 3 by the aforementioned return springs 32a-d. In the preferred brake-by-wire operating mode, a movement of the brake pedal 1 is coupled to a movement of the pedal force transmitting element 2. In this case the travel of the pedal force transmitting element 2 coupled to the brake pedal 1 is detected by means of the travel detecting device 27. From this acquired signal representing the brake pedal travel the driver's deceleration request is ascertained in the electronic control unit 31 (represented only schematically). A system pressure value is calculated from this deceleration request.

Finally, wheel-individual wheel brake pressure values are derived as required from the system pressure value initially provided jointly for all wheel brakes—for example with the aid of ABS, ASR and ESP control algorithms to avoid wheel locking, wheel-spin and skidding or overturning of the vehicle.

In order to subject the wheel brakes to the system pressure value, this pressure may be made available in all wheel brakes by electronic activation of the pressure generating device 14 via the pressure modulation valves 6a to 6d and the dividing piston devices 5a-d. If, in this case, the pressure of a wheel brake is to be reduced, this is possible by opening the corresponding pressure modulation valve 6a-d and the aforementioned currentlessly open 2/2-way valve 24. During the pressure regulation processes in the brake-by-wire mode that have been mentioned, the retaining piston 3 is held against a stop (not shown) in the housing 20 by the system pressure, so that, upon actuation of the brake pedal 1, a pedal feel predetermined by the elastic springs 21, 22 of the travel simulator 13 is communicated to the driver.

In event of electric power failure caused, for example, by a battery defect, a short circuit or by switching off the ignition, the brake system according to the invention is automatically transferred to a fall-back operating mode in which only braking by the driver is possible. In this operating mode the retaining piston 3 is moved to the left in the drawings upon actuation of the pedal 1. In this case, the mechanically actuable activation elements 17a-d previously described, which transmit the movement of the retaining piston 3 to the dividing pistons 5a-d, engage. In this case the transmission is preferably effected in such a way that the dividing piston travel distances are equal to the travel of the retaining piston 3. Through suitable constructional dimensioning, the pedal characteristic curve changes, upon initiation of the fall-back level, to a degree which signals to the driver that the brake system is in an emergency operating mode, the change in the pedal characteristic curve being so designed that excessive irritation of the driver does not occur.

As a result of the four hydrostatic wheel brake circuits, the proposed brake system has advantages over brake systems currently in series production while incurring equal, if not even lower, requirements in terms of installation space, weight and number of technically demanding parts such as valves, pistons and seals. As a brake-by-wire brake system, it meets the current demands for integrated brake force boosting with freely definable characteristic curve, for example with a "Springer" function, external controllability and absence of pedal reaction during electronic interventions to regulate braking pressure.

While the above description constitutes the preferred embodiment of the present invention, it will be appreciated that the invention is susceptible to modification, variation and change without departing from the proper scope and fair meaning of the accompanying claims.

The invention claimed is:

1. A brake system for motor vehicles which, in a brake-by-wire operating mode, can be activated both by the vehicle driver and independently of the vehicle driver, and is operated preferably in the brake-by-wire operating mode and can be operated in at least one fall-back operating mode in which only operation by the vehicle driver is available, comprising:
   a) a brake pedal (1) for actuating a pedal force transmitting element (2) on which an actuating force is exerted when the brake system is actuated by the vehicle driver, the pedal force transmitting element (2) is guided displaceably along an actuation axis in a hydraulic retaining piston (3) which delimits a hydraulic retaining chamber (4) in a housing (20),
   b) a travel detecting device (27) which detects the actuation travel of the pedal force transmitting element (2),
   c) a travel simulator (13; 21, 22) which in the brake-by-wire operating mode communicates brake pedal feel to the vehicle driver, which is in force-transmitting communication with the pedal force transmitting element (2) and the effect of which can be switched off in the fall-back operating mode,
   d) an electrohydraulic pressure generating device (14) which delivers a brake system pressure,
   e) a plurality of electrically controllable pressure modulation valves (6a-d) for setting wheel-individual brake pressures which are derived from the brake system pressure, the pressure modulation valves (6a-d) delivering or transmitting the brake system pressure in an unactivated state,
   f) a plurality of dividing piston devices (5a-d; 7a-d, 8a-d) each having a first dividing piston portion (7a-d) and a second dividing piston portion (8a-d), the first dividing piston portion forming a first dividing piston surface (9a-d) and a second dividing piston surface (10a-d), the second dividing piston portion forming a third dividing piston surface (11a-d) the first dividing piston surface (9a-d) delimits with the third dividing piston surface (11a-d) an intermediate chamber (16a-d) which is connected to the electrohydraulic pressure generating device (14) via one of the pressure modulation valves (6a-d) by means of which both a pressure build-up and a pressure reduction are effected in the intermediate chamber (16a-d), and the second dividing piston surface (10a-d) subjected to a pressure which is transmitted via hydraulic connections to the wheel brakes,
   g) activating elements (17a-d) for mechanically activating the dividing piston devices (5a-d; 8a-d), and
   h) an electronic control and regulation unit (31).

2. The brake system as claimed in claim 1, further comprising in that the pedal force transmitting element (2) bears against a force transmitting plate (19) the movement of which in an actuation direction of the brake pedal makes possible a displacement of the pedal force transmitting element (2) in the direction of actuation of the travel simulator (13).

3. The brake system as claimed in claim 2, further comprising in that the pedal force transmitting element (2) bears against the force transmitting plate (19) by means of at least one rod-shaped support force transmitting element (25).

4. The brake system as claimed in claim 3 further comprising in that the force transmitting plate (19) is preloaded against the actuation direction by means of a compression spring (18) having a spring force which is substantially greater than the spring force of at least one simulator spring (21, 22) forming a component of the travel simulator (13).

5. The brake system as claimed in claim 4 further comprising in that the end of the compression spring (18) located opposite the force transmitting plate (19) bears against the second dividing piston portions (8a-d), whereby the actuating force transmitted by the pedal force transmitting element (2) via the at least one support force transmitting element (25) to the force transmitting plate (19) can be transmitted to the dividing piston devices (5a-d; 8a-d) via the compression spring (18).

6. The brake system as claimed in claim 4 further comprising in that there are provided hydraulic means (50) which can be subjected to pressure by means of the electrohydraulic pressure generating device (14) and, when subjected thereto, effect a displacement of the force transmitting plate (19) in the actuation direction, whereby the compression spring (18) is compressed and the at least one support force transmitting element (25) is released.

7. The brake system as claimed in claim 6, further comprising in that the hydraulic means are in the form of piston elements (50) guided in the retaining piston (3).

8. The brake system as claimed in claim 1 further comprising in that a hydraulic connection, which can be blocked by means of a solenoid valve (23) and via which the retaining chamber (4) can be subjected to pressure, is provided between the electrohydraulic pressure generating device (14) and the hydraulic retaining chamber (4).

9. The brake system as claimed in claim 6 further comprising in that the hydraulic means (50) are subjected to a retaining pressure via a hydraulic connection to the retaining chamber (4).

10. The brake system as claimed in claim 4 further comprising a second retaining chamber (35) and a high-pressure accumulator (33) which communicate hydraulically with one another, and a solenoid valve (36) via which the high-pressure accumulator (33) and the second retaining chamber (35) are connectable to the pressure generating device (14).

11. The brake system as claimed in claim 6 further comprising in that the hydraulic means (50) are pressurized via a hydraulic connection to one of the retaining chambers (4, 35).

12. The brake system as claimed in claim 10 further comprising in that a mechanically actuable pressure-regulating valve arrangement (34) is provided in the retaining piston (3) and is actuated via a pressure-regulating valve actuating element (37) with the force of the simulator springs (21, 22).

13. The brake system as claimed in claim 12, further comprising in that a reservoir connection (T) of the pressure-regulating valve arrangement (34) is connected to a pressure medium reservoir (12), a pressure supply connection (P) is connected to the high-pressure accumulator (33) and a working connection (A) is connected via a normally open solenoid valve (39) to the pressure modulation valves (6a-d).

14. The brake system as claimed in claim 13, further comprising in that the connection of the reservoir connection (T) to the pressure reservoir (12) is effected by flooding of a chamber (38) containing the compression spring (18) in the retaining piston (4).

15. The brake system as claimed in claim 13 further comprising in that the connection of the pressure supply connection (P) to the high-pressure accumulator (33) is effected via the first retaining chamber (4) and the connection of the working connection (A) to the pressure modulation valves (6a-d) via the second retaining chamber (35).

* * * * *